United States Patent [19]

Easton

[11] Patent Number: 4,657,069
[45] Date of Patent: Apr. 14, 1987

[54] HEAT EXCHANGE TUBE RETAINER
[75] Inventor: David J. Easton, Cedar Falls, Iowa
[73] Assignee: Deere & Company, Moline, Ill.
[21] Appl. No.: 846,433
[22] Filed: Mar. 31, 1986
[51] Int. Cl.⁴ .............................................. F28F 7/00
[52] U.S. Cl. ..................................... 165/76; 165/173; 165/175
[58] Field of Search ................ 165/172, 173, 175, 69, 165/76

[56]  References Cited
U.S. PATENT DOCUMENTS

| | | | |
|---|---|---|---|
| 1,412,056 | 4/1922 | Hughes et al. | 165/76 |
| 1,416,337 | 5/1922 | Deane | 165/76 |
| 1,767,652 | 6/1930 | Daley | 165/172 |
| 1,852,363 | 4/1932 | Parent | 165/172 |
| 2,161,019 | 6/1939 | Coy | 165/175 |
| 3,503,440 | 3/1970 | Romanos . | |
| 4,167,211 | 9/1979 | Haller . | |
| 4,191,244 | 3/1980 | Keske . | |
| 4,216,824 | 8/1980 | Braun et al. | 165/69 |
| 4,220,199 | 9/1980 | Romanos . | |
| 4,344,478 | 8/1982 | Petaja et al. . | |
| 4,449,575 | 5/1984 | Laws et al. . | |
| 4,538,550 | 9/1985 | Haller et al. | |
| 4,550,690 | 11/1985 | Baugher . | |

Primary Examiner—Albert W. Davis, Jr.
Assistant Examiner—R. R. Cole

[57] ABSTRACT

A heat exchange tube retainer includes a substantially flat base from one side of which project two tube-gripping parts. One part has a tube-receiving opening which opens away from the base. The other part has a tube-receiving opening which opens away from the one part.

13 Claims, 4 Drawing Figures

4,657,069

HEAT EXCHANGE TUBE RETAINER

BACKGROUND OF THE INVENTION

This invention relates to a tube retainer for holding heat exchange tubes in place in a heat exchange apparatus such as a radiator.

A known heat exchange apparatus is described in U.S. Pat. No. 4,344,478 issued 17 Aug. 1982 to Petaja et al. In this apparatus, each heat exchange tube is held in place by a separate spacer or retainer which resiliently and releasably receives one of the tubes. Thus, each retainer must be individually attached to and removed from a tube to secure and remove the tube from the assembly. To remove a retainer from its corresponding tube, a protruding portion of each retainer must be grasped by a pair of pliers. But first, the retainer must be oriented so that the appropriate protruding portion is aligned so as to be accessible to the pliers. It would be desirable to provide a tube retainer which does not require alignment and which can be removed without the use of pliers.

SUMMARY OF THE INVENTION

An object of the present invention is to provide a heat exchange tube retainer which is easily attached to and disconnected from a heat exchange apparatus.

Another object is to provide such a tube retainer which cannot be misaligned when coupled to a tube.

These and other objects are achieved by the present invention wherein a heat exchange tube retainer includes a generally flat base. Projecting from one side of the base are one or more tube gripping members and a tube gripping element. The members have a tube-receiving recess or opening which opens away from the base. The element has a tube-receiving channel which opens away from the other member or members. Each retainer includes a curved lip on one end which overlaps the other end of an adjacent retainer.

DETAILED DESCRIPTION

Figure 1:
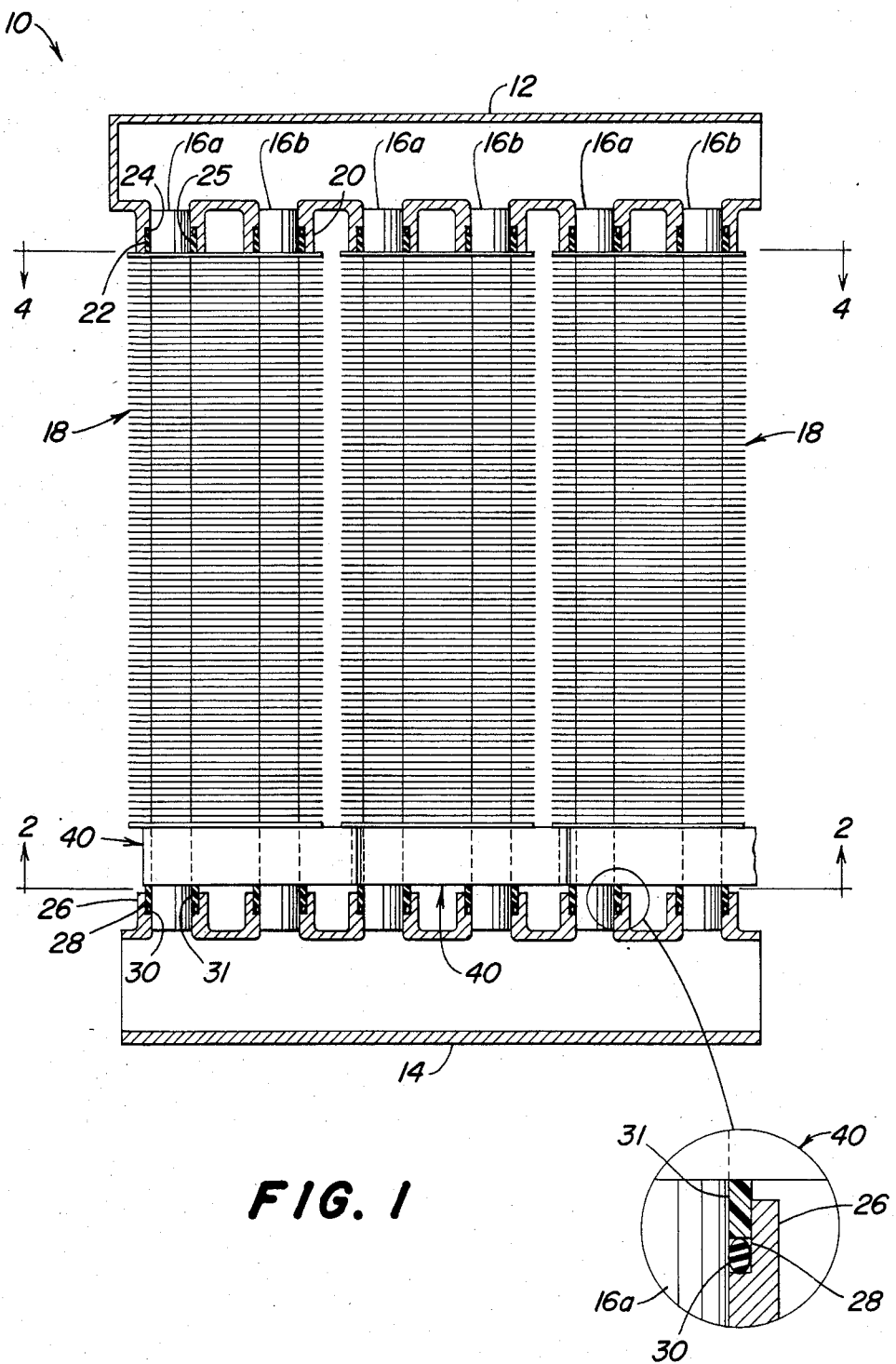
FIG. 1 is a diagrammatic partial cross-sectional view of a heat exchange apparatus for use with the tube retainer of the present invention.

FIG. 1, which is diagrammatic and not to scale, shows a portion of a heat-exchanger or radiator 10 having an inlet duct 12 and an outlet duct 14 interconnected by a plurality of parallel-extending coolant tubes 16a, 16b. Each adjacent pair of tubes 16a, 16b supports a separate set of cooling fins 18. The inlet duct 12 includes a plurality of hollow cylindrical sleeves or necks 20 which project from the duct 12. Each sleeve 20 includes an annular channel 22 extending part-away therein from its outer end. The channel 22 receives an O-ring 24 which may be held in place by a retainer ring 25. The o-ring 24 seals between an end of the tube and the sleeve 20. The outlet duct 14 includes a similar sleeves 26, channels 28, O-rings 30 and retainer rings 31 for receiving and sealing with the other end of the tubes.

One end of each set of fins 18 abuts directly against the ends of the sleeves 20. The other end of each set of fins is spaced apart from the ends of the sleeves 26. The part of each pair of tubes which extends across this space receives a retainer 40 which prevents axial movement of the tubes by engaging the fins 18 and the end of the sleeves 26.

Figure 2:
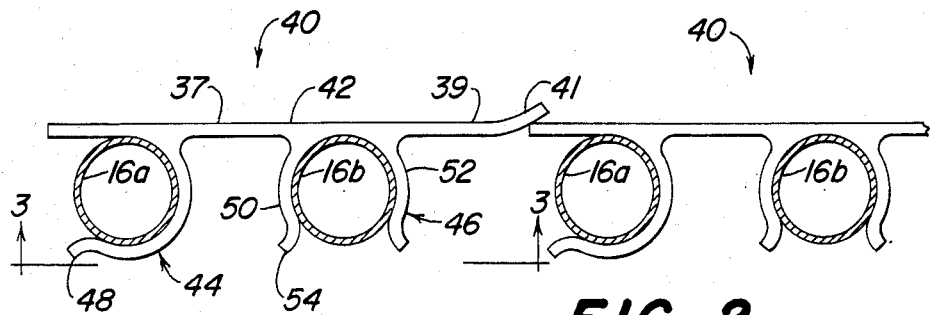
FIG. 2 is a view along lines 2—2 of FIG. 1.
Figure 3:
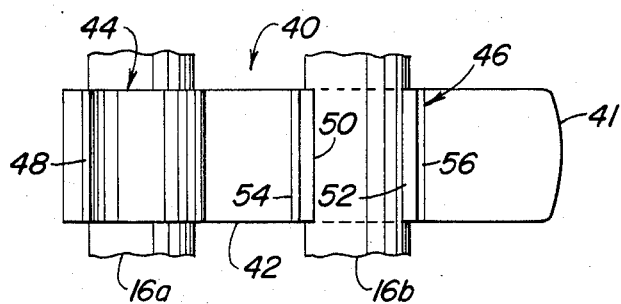
FIG. 3 is a view along lines 3—3 of FIG. 2.
Figure 4:
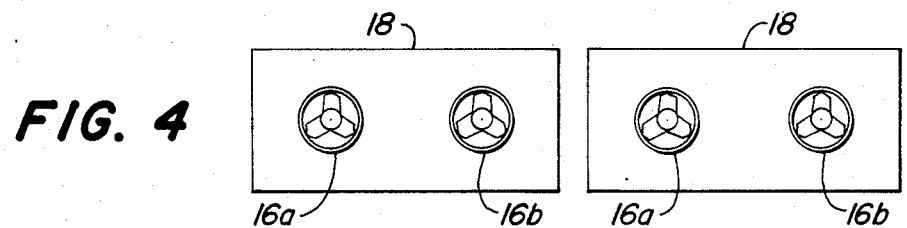
FIG. 4 is a view along lines 4—4 of FIG. 1.

Turning now to FIGS. 2 and 3, each retainer 40 includes a generally flat rectangular base 42. A tube gripping element 44 and a tube gripping member 46 project from one side of the base 42. Each base 40 includes a first section 37 which extends between the member 46 and the element 44 and an arm 39 which extends away from member 46 toward the adjacent retainer. The arm 39 terminates in a curved lip 41 which engages and overlaps the other end of the base of the adjacent retainer, as best seen in FIG. 2. Element 44 has a generally part-cylindrical shape for releasably receiving and holding one of the tubes 16a. Element 44 forms a tube-receiving opening which faces away from the member 46 and which extends along an axis which is generally parallel to the base 40. The outer end of element 44 forms a curved lip 48 which facilitates insertion of element 44 onto a tube 16a.

Member 46 is formed by one or two part-cylindrically curved arms 50, 52 which together engage and receive a tube 16b therebetween. The arms 50, 52 terminate at curved lips 54, 56. The arms 50, 52 and the lips 54, 56 form a tube-receiving opening which opens away from the base 42 and in a direction which is generally perpendicular to the opening direction of element 44 and which extends along an axis which is generally parallel to the base and parallel to the axis of the opening in element 44.

One variation of the present invention would be to lengthen the base 40 and provide one or more additional tube gripping members (similar to member 46) adjacent to the first member 46. Also, this tube retainer could be used in a heat exchanger where each tube is connected to a separate set of cooling fins.

MODE OF OPERATION

To remove the retainer 40 from its pair of tubes 16a, 16b, one inserts a tool, such as the blade of a screw driver, under the lip 41 to pry the lip 41 away from the end of the adjacent retainer. The arm 39 acts as a lever arm for pivoting the retainer about the axis of tube 16a. This pivots the retainer 40 and disengages member 46 from tube 16b. Once member 46 is pivoted clear of tube 16b, the body 40 may be grasped manually so that element 44 can be disengaged from tube 16a, thus completely disconnecting and removing the retainer 40 from the tubes 16a, 16b. Then, viewing FIG. 1, the tubes 16a, 16b can be moved downwardly and removed from the sleeves 20. The tubes 16a, 16b can then be moved upwardly and removed from the sleeves 26. Attachment of the retainer 40 to the tubes 16a, 16b is accomplished by reversing the steps described above.

While the invention has been described in conjunction with a specific embodiment, it is to be understood that many alternatives, modifications and variations will be apparent to those skilled in the art in light of the aforegoing description. Accordingly, this invention is intended to embrace all such alternatives, modifications and variations which fall within the spirit and scope of the appended claims.

I claim:
1. A heat exchange tube retainer comprising:
  a generally flat base;

a tube gripping member mounted on the base and having a heat exchange tube receiving recess therein, the recess opening in a first direction generally away from the base and extending along an axis; and a tube gripping element mounted on the base, spaced apart from the member and having a heat exchange tube receiving channel therein, the channel opening in a second direction generally perpendicular to the first direction and generally away from the member and extending along an axis which is generally parallel to the axis of the recess.

2. The heat exchange tube retainer of claim 1, further comprising:

a lever arm projecting from the member for use in pivoting the retainer about an axis of a tube received by the tube gripping element.

3. The retainer of claim 2, wherein:

the member is positioned along the base at a point located between the element and the lever arm.

4. In a heat exchange apparatus having at least two parallel extending heat exchange tubes, fin means for transferring heat from said tubes to the environment, an inlet manifold having apertures for receiving one end of each tube and an outlet manifold having apertures for receiving another end of each tube, a tube retainer for preventing axial movement of the tubes with respect to the manifolds, the retainer comprising:

a base;

a tube gripping member mounted on the base and having a recess therein for receiving one tube of said pair of tubes, the recess opening in a first direction generally away from the base; and a tube gripping element mounted on the base, spaced apart from the member and having a channel therein for releasably receiving the other tube of said pair of tubes, the channel opening in a second direction generally perpendicular to the first direction and generally away from the member.

5. The tube retainer of claim 4, wherein:

the retainer is pivotal about an axis of the other of said tubes to engage and disengage the tube gripping member from the one tube.

6. The tube retainer of claim 5, wherein:

a lever arm projects from the member, the member being positioned along the base at a point located between the element and the lever arm.

7. A heat exchange apparatus comprising:

at least first and second pairs of parallel extending heat exchange tubes;

fin means for transferring heat from said tubes to the environment;

an inlet manifold having apertures therein for receiving one end of each of said tubes;

an outlet manifold having apertures therein for receiving another end of each of said tubes; and a first tube retainer for retaining the first pair of tubes within the heat exchange apparatus and a second tube retainer for retaining the second pair of tubes within the heat exchange apparatus, each tube retainer comprising a tube gripping element having a tube-receiving channel therein, a tube gripping member having a tube-receiving slot therein, a base rigidly interconnecting the member and the element, and a lever arm extending away from the member, the lever arm of one of the tube retainers being in overlapping engagement with the base of the other of the tube retainers when both retainers are mounted on their respective pairs of tubes.

8. The heat exchange apparatus of claim 7, wherein:

each channel of each retainer opens in a direction facing generally away from the tube gripping member of said retainer.

9. The heat exchange apparatus of claim 8, wherein:

each tube gripping member is positioned along the base at a point located between the lever arm and the tube gripping element of each tube retainer.

10. The heat exchange apparatus of claim 8, wherein:

each slot is open in a direction substantially normal to the opening direction of the channel of each tube retainer.

11. The heat exchange apparatus of claim 10, wherein:

each tube retainer is pivotal about the tube received its channel to engage and disengage the tube-gripping member from the heat exchange tube received by said member.

12. The heat exhange apparatus of claim 7, wherein:

each tube retainer is pivotal about the tube received its channel to engage and disengage the tube-gripping member from the heat exchange tube received by said member.

13. The heat exchange apparatus of claim 12, wherein:

an end portion of the base of the other tube retainer comprises a fulcrum for use in prying the lever arm of the one tube retainer away from said end portion to pivot the one tube retainer about the tube received by the channel of the one tube retainer.

* * * * *